(12) United States Patent
Polonenko et al.

(10) Patent No.: US 7,263,936 B2
(45) Date of Patent: Sep. 4, 2007

(54) DEVICE FOR ASSISTING TRANSPLANTING OF SEEDLINGS, MACHINE INCORPORATING THE DEVICE, AND METHOD USING THE DEVICE

(75) Inventors: Daniel R. Polonenko, North Saanich (CA); George Zimmer, Chatham (CA); Wayne Zimmer, London (CA); Charles Mullner, Guelph (CA); Jon De La Campa, Summerland (CA); Steven C. Grossnickle, North Saanich (CA); Jamie Patterson, Victoria (CA)

(73) Assignee: Cellfor Inc., Saanichton, British Columbia (CA)

( * ) Notice: Subject to any disclaimer, the term of this patent is extended or adjusted under 35 U.S.C. 154(b) by 45 days.

(21) Appl. No.: 10/860,129

(22) Filed: Jun. 4, 2004

(65) Prior Publication Data

US 2005/0016426 A1  Jan. 27, 2005

Related U.S. Application Data

(60) Provisional application No. 60/475,487, filed on Jun. 4, 2003.

(51) Int. Cl.
*A01C 11/00* (2006.01)
*A01G 23/02* (2006.01)

(52) U.S. Cl. .................. 111/101; 111/105; 111/111
(58) Field of Classification Search ........ 111/100–105, 111/109–117, 89–99
See application file for complete search history.

(56) References Cited

U.S. PATENT DOCUMENTS

| | | | |
|---|---|---|---|
| 1,638,368 A | 8/1927 | Shaw | |
| 2,749,855 A | 6/1956 | Guigas | 111/3 |
| 3,643,611 A | 2/1972 | Owens et al. | 111/2 |
| 4,177,743 A | 12/1979 | Webster | 111/3 |
| 4,355,588 A | 10/1982 | Armstrong et al. | 111/109 |
| 4,443,151 A | 4/1984 | Armstrong et al. | 414/404 |
| 4,660,479 A | 4/1987 | Crisio, Jr. et al. | 111/105 |
| 4,765,260 A | 8/1988 | Cafri | 111/115 |
| 6,167,819 B1 | 1/2001 | Rail | 111/101 |
| 2002/0043195 A1 | 4/2002 | Williams | 111/105 |

FOREIGN PATENT DOCUMENTS

DE  A1 29 44 362  5/1980

OTHER PUBLICATIONS

Patent Abstracts of Japan, 04033167 JP, "Seedling Transplanter", Feb. 5, 2004, A01C01102, Suzuki, Takashi.

*Primary Examiner*—Christopher J. Novosad (57) ABSTRACT

Seedlings are typically grown in trays of soil plugs. Once the seedlings have attained a predetermined size, they may be transplanted to the ground for continued seedling growth and development. Several machines are known in the art, which allow automated seedling transplantation. The present invention provides a device that significantly improves the accuracy of automated transplantation of seedlings. The device encompasses, at least in preferred aspects, a ski-like apparatus including a defined planting slot for receiving the seedlings to be planted. Furthermore, a blade extending in front of the device cuts open the ground in preparation for plantation. The configuration of the device enables seedlings to be planted accurately to a desired planting depth. The device is particularly suited for use in connection with coniferous tree seedlings, and enables automated transplantation of such seedlings at high speed. The invention pertains to the device, to machines adapted to incorporate the device, and also to methods of seedling transplantation involving the device.

15 Claims, 4 Drawing Sheets

DEVICE FOR ASSISTING TRANSPLANTING OF SEEDLINGS, MACHINE INCORPORATING THE DEVICE, AND METHOD USING THE DEVICE

CROSS REFERENCE TO RELATED APPLICATIONS

This application is related to commonly owned provisional patent application Ser. No. 60/475,487 filed Jun. 4, 2003, and claims the benefit of this earlier filing date.

FIELD OF THE INVENTION

The present invention relates to the field of agricultural machinery for the automated transplanting of plants. In particular, the invention relates to a machine for the extraction of soil plugs (and plants grown therein) from corresponding soil-plug trays, and the planting of the soil plugs into the ground. The invention is especially related to the transplanting of coniferous seedlings.

BACKGROUND TO THE INVENTION

The forestry industry is responsible for large-scale propagation and development of coniferous trees. This involves the careful nurturing of seeds or tree embryos to seedlings under controlled greenhouse conditions. Typically, the seedlings are grown in trays comprising a plurality of soil plugs generally arranged in ordered rows. Each soil plug comprises the root system of an individual seedling, the 'above-ground' portion of the seedling, including the needles, extending from the soil plug. The presence of a polymeric binding substance, which is optionally mixed with the plant growing media, can help to preserve the integrity of the soil plug during seedling transportation or transplantation.

Soil plugs generally have limited sizes and can only sustain continued seedling development for a limited period. Once a seedling has grown to a predetermined size (dependent upon the size of the soil plug) the seedling must be transplanted either to a larger soil plug or into the ground. In the forestry industry, it is often impractical to transfer seedlings to successively larger soil plugs. Therefore, the seedlings are typically transferred directly into the ground, once they have attained a viable size and root system.

A number of machines are known in the art for the automated transplantation of seedlings. However, the inventors are aware of significant inadequacies in the use of such prior art machines for the transplanting of coniferous tree seedlings for the forestry industry.

In one example of the prior art, U.S. Pat. No. 4,660,479, issued Apr. 28, 1987, discloses a trailer-type apparatus for planting canisters contained seedlings. The apparatus includes a furrow forming plow followed by a backfill blade sequentially operated for forming the furrow and covering the roots of a seedling deposited in the furrow. The apparatus also includes a belt-type conveyor provided with transverse recesses, which receives canister contained tree seedlings from a supply hopper and deposits the seedlings in sequence on a seedling supporting ramp. A pressure cylinder plunger separates the seedling from its canister and deposits it on a pivoting platform lowering the seedling by gravity into a sleeve chute where it is temporarily supported until a quantity of water, released from an adjacent tank, washes the seedlings out of a chute to fall into an underlying furrow.

In another example, U.S. Pat. No. 4,765,260, issued Aug. 23, 1988, discloses a machine for transplanting seedlings, which comprises a chassis onto which are connected a plurality of planting units. Each unit comprises a double pathway defined by a double end-less chain which carries sleeve shaped members, and an air stream assisted seedling supply means respectively engagable with each sleeve member for supplying a seedling into each sleeve when each sleeve is inserted into the ground. The machine further comprises a rotating member which carries pointed dibbles that become inserted through each sleeve member moving on a pathway with the endless chain into the soil, for making a hole in the ground to assist insertion of the seedling.

In a final example, U.S. Pat. No. 4,355,588, issued Oct. 26, 1982, discloses a machine for transplanting soil plugs comprising a conveyor having a plurality of soil plug gripping mechanisms mounted thereto, a furrow opening device, and a furrow closing device. Generally, the furrow closing device is defined by portions of a bed shaper that operates to form the soil into a trapezoidal planting bed. In addition, the bed shaper establishes a ground level with respect to which the plugs are planted, in which the rear portions of the bed shaper act to close the furrow. Each plug gripping assembly preferably comprises a centre opening clip having opposed resilient fingers. The conveyor path is characterized by a lower horizontal path portion that maintains the plugs at the proper planting depth for a significant interval so that the soil may be properly closed around the plugs before the plugs are released.

The rapid, automated handling of soil plugs, and the plants grown therein, has presented significant challenges to the forestry industry. As discussed, a number of automated transplanters are known in the art, which extract soil plugs from trays, and transfer the soil plugs to a planting position adjacent the ground. However, many such machines are generally adapted for handling agricultural crops, rather than coniferous tree seedlings.

The inventors of the present invention have found that the machines of the prior art are not ideally suited to the handling of tree seedlings. Compared to most agricultural crops, tree seedlings are relatively fragile and must be handled with great care to avoid damage. To remain viable, tree seedlings require accurate placement in the ground at a predetermined depth and orientation. Misplacement of tree seedlings, for example at an improper depth, or a non-vertical orientation, can result seedling loss.

In contrast to many agricultural crops, it is often desirable to plant tree seedlings under soil conditions that are less than ideal for automated planting. For example, such soil conditions may include undulating or uneven soil, hard-baked soil, or water-saturated soil. The automated transplanters of the prior art generally operate only at optimum soil conditions, and provide less than satisfactory results under adverse soil conditions. For example, some transplanters even require laser-levelled fields in order to ensure accurate placement and planting of seedlings. Therefore, there is a continuing need to develop machinery and corresponding systems that ensure accurate planting of seedlings, including tree seedlings, to an accurate planting depth under less than optimum soil conditions.

Furthermore, there is a continuing need to develop transplanting machines that enable tree seedlings to be planted rapidly, and in a high density, for example, a density of up to 24 seedlings per square foot. This density would permit efficient land usage and facile seedling maintenance, and also confer a degree of resistance to adverse environmental factors such as wind damage.

SUMMARY OF THE INVENTION

It is an object of the present invention to provide an improved machine for the transplanting of soil plugs, and tree seedlings contained therein.

It is a further object of the invention to provide a machine that enables soil plugs comprising tree seedlings to be transplanted at a rate of up to 120,000 seedlings per hour, with a density of up to 24 seedlings per square foot.

It is a further object of the present invention to provide a machine for the transplantation of soil plugs, and tree seedlings contained therein, which permits the placement of the tree seedlings into the ground at a desired depth and orientation.

It is a further object of the present invention to provide a machine that is capable of transplanting soil plugs at a desired planting depth under adverse soil conditions, including but not limited to undulating soil, hard-baked or dry soil, water saturated soil etc.

The present invention provides significant improvements over the transplanting machines of the prior art, to provide a system that is particularly suited to the rapid and efficient transplanting of seedlings such as coniferous tree seedlings contained in soil plugs. In particular, the present invention provides a means to permit transplantation of tree seedlings under less-than-ideal soil conditions, including undulating soil, hard-baked soil, and water-saturated soil, and plant the seedling at a near optimal planting depth.

The present invention includes, at least in particularly preferred embodiments, a machine that corresponds in part to that described by U.S. Pat. No. 4,355,588, issued Oct. 26, 1982, and U.S. Pat. No. 4,443,151, issued Apr. 17, 1984, which are incorporated herein by reference.

Importantly, the present invention provides significant improvements over the teachings of U.S. Pat. No. 4,355,588 and U.S. Pat. No. 4,443,151, which permit the machine to process and accurately transplant coniferous tree seedlings at a desirable high rate of transplantation, and at a desired planting depth. The improvements pertain in part to replacement of the bed shaper and the furrow opening and closing means, as well as other corresponding integrated aspects of the machine. The preparation and modifications to the machine disclosed in U.S. Pat. No. 4,355,588 provide particularly unexpected and dramatic improvements in the capacity of the machine to operate efficiently under variable conditions for the transplantation of seedlings, in particular tree seedlings. The accuracy of seedling positioning and planting depth has been significantly improved.

However, it is to be noted that the invention is not limited in application to machines derived from the teachings of U.S. pat. Nos. 4,355,588, and 4,443,151. In fact, the ground preparation and modification devices of the present invention may be fitted to any planting machinery designed for the planting of coniferous or other types of seedlings, where careful and accurate seedling planting is desired.

In one aspect of the present invention there is provided a machine for transplanting plant seedlings, the machine comprising: a frame adapted to be moved in a direction of movement over a surface of an area of ground in which seedlings are to be planted, the frame supporting a holder for trays containing plugs of growth medium each containing a plant seedling, an ejector for removing the plugs from the trays to produce freed plugs, a planting mechanism for planting the freed plugs in a row in said area of ground, and a conveyor mechanism for conveying the freed plugs from the ejector to the planting mechanism, wherein said frame carries a ground preparation and modification device comprising two elongated members, each having ground-engaging lower surfaces, said members extending generally in parallel with each other in alignment with said direction of movement of the frame and spaced from each other to form a planting slot through which said planting mechanism plants said freed plugs into said area of ground, and a ground cutting blade positioned ahead of the slot in the direction of movement of the frame, thereby forming a cut in the ground into which said plugs are inserted through the slot as said frame advances over said surface.

Preferably, said conveying means includes a horizontal path portion for positioning said seedlings adjacent the ground in said planting slot at or near ground speed. More preferably, each ground cutting blade also projects backwards into said planting slot to a position adjacent said horizontal path portion of said conveyor means.

Preferably, each ground cutting blade intersects a surface of the ground at an angle of from 15° to 45° from horizontal. More preferably, each ground cutting blade intersects a surface of the ground at an angle of about 22° from horizontal.

Preferably, each ground cutting blade also projects beneath the device to a depth substantially similar or greater than a base of the soil plug in the planting position.

Preferably, each elongated member has a ski-like elevational profile, thereby to facilitate movement of said ground preparation and modification device across the surface of the ground, or through surface layers of the ground.

Preferably, each ground preparation and modification device further comprises means to prevent excessive soil build-up in said planting slot between said elongated members. More preferably, said means to prevent excessive soil build-up comprises a pair of bifurcating ribs extending behind and beneath the ground cutting blade.

Preferably, the machine further comprises means to increase or decrease a height of the device relative to said frame, to alter a planting depth of said seedlings, or to lift the device off the ground as required. More preferably, the means to increase or decrease a height of each device comprises hydraulic means.

Preferably, each device can undergo limited lateral movement in a direction perpendicular to the direction of motion of the machine.

Preferably, each device can be displaced vertically against the bias of a biasing means, such as a spring or springs thereby causing said elongated members to exert a pressure upon said ground.

Preferably, the machine further comprises means to incline or decline the pitch of each device relative to a horizontal plane.

Preferably, the machine further comprises an automatic speed control system for regulating the speed of movement of the conveyor means equal or close to the ground speed of the machine, thereby to maintain the planting mechanism at near zero ground speed when in said horizontal path portion, regardless of the ground speed of the machine. More preferably, said automatic speed control system comprises a mechanical drive system comprising a drive wheel in contact with the ground, and linkage means to provide power from said drive wheel to said planting mechanism. More preferably, said automatic speed control system comprises a radar or laser based ground speed detector coupled to a hydraulic drive system for providing power to said planting mechanism.

Preferably, the machine further comprises a fluffer for fluffing the soil and improving the consistency of the soil around the planted seedlings.

More preferably, the fluffer comprises a plurality of fluffing elements each attached at a first end thereof to a continuously driven belt, the second end thereof dragging across the ground to fluff the soil around the planted seedlings behind the machine, and optionally the height of the fluffing elements relative to the ground being adjustable according to ground conditions.

Preferably, the soil plugs are supplied to the machine in trays of soil plugs ordered into rows, the machine further comprising means for ejecting each soil plug from a tray of supplied soil plugs. More preferably, the means for ejecting each soil plug comprises a plurality of aligned extending prongs, spaced for placement into a row of the tray to eject the row of plugs from the tray for conveyance to the planting position.

Preferably, each soil plug comprises, other than the root system of the seedling: a growth media, optionally an elastomeric polymer for conferring resilience and improved ejection integrity to the soil plug, and optionally a slip agent for preventing adherence of the soil plug to the sides of a corresponding soil plug hole in said tray.

Preferably, the slip agent is applied either to a surface of said hole in said tray, to a surface of said soil plug, or to an interface between said soil plug and said tray.

In another aspect there is provided a soil plug for use in connection with the machine of the present invention, wherein the soil plug comprises, other than the root system of a seedling: a growth media, optionally an elastomeric polymer for conferring resilience and improved ejection integrity to the soil plug, and optionally a slip agent for preventing adherence of the soil plug to the sides of a corresponding soil plug hole in said tray. The slip agent is applied either to a surface of said hole in said tray, to a surface of said soil plug, or to an interface between said soil plug and said tray.

In another aspect there is provided a tray of soil plugs for use in connection with the machine of the present invention, the tray comprising a plurality of soil plugs arranged in rows, wherein each soil plug comprises, other than the root system of a seedling: a growth media, optionally an elastomeric polymer for conferring resilience and improved ejection integrity to the soil plug, and optionally a slip agent for preventing adherence of the soil plug to the sides of a corresponding soil plug hole in said tray. Preferably, tray comprises a plurality of soil plug holes for receiving soil plugs for growing seedlings, wherein at least the internal surfaces of the soil plug holes are pre-coated with a coating of a slip agent prior to insertion of a soil plug, the slip agent assisting ejection of each soil plug during operation of the machine.

In another aspect of the present invention there is provided a ground preparation and modification device for use in connection with a machine adapted to move over the ground for transplanting seedlings, the machine including conveying means for conveying seedlings into a planting position, wherein the device extends generally parallel to the direction of motion of the machine and comprises:

two elongated members joined in a substantially parallel relationship to define therebetween a planting slot having a substantially uniform width, each elongated member configured to contact and exert a pressure upon the ground during forward motion of the machine, the planting slot positioned to accommodate a soil plug in said planting position; and a ground cutting blade integral with and projecting forward of each device in general alignment with the planting slot, to cut open the ground in front of the device during forward motion of the machine.

Preferably, said conveying means includes a horizontal path portion for positioning said seedlings adjacent the ground in said planting slot at or near ground speed.

Preferably, each ground cutting blade also projects backwards into said planting slot to a position adjacent said horizontal path portion of said conveyor means.

Preferably, each ground cutting blade intersects a surface of the ground at an angle of from 15° to 45° from horizontal. More preferably, each ground cutting blade intersects a surface of the ground at an angle of about 22° from horizontal.

Preferably, each ground cutting blade also projects beneath the device to a depth substantially similar or greater than a base of the soil plug in the planting position.

Preferably, each elongated member has a ski-like elevational profile, thereby to facilitate movement of said ground preparation and modification device across the surface of the ground, or through surface layers of the ground.

Preferably, the device further comprises means to prevent excessive soil build-up in said planting slot between said elongated members. More preferably, said means to prevent excessive soil build-up comprises a pair of bifurcating ribs extending behind and beneath the ground cutting blade.

Preferably, each device can undergo limited lateral movement in a direction perpendicular to the direction of motion of the machine.

Preferably, in use said device can be displaced vertically against the bias of a biasing means, such as a spring or springs thereby causing said elongated members to exert a pressure upon said ground.

Preferably, in use the pitch of each device can be inclined or declined relative to a horizontal plane.

Preferably, in use the height of the device relative to the ground, or the degree of pressure that the device exerts on the ground, can be adjusted.

Preferably, the speed of movement of the conveyor means is substantially equal to the ground speed of the device, thereby to maintain the seedlings at or near zero ground speed for planting when in said horizontal path portion.

In yet another aspect of the present invention there is provided a method for transplanting soil plugs each containing a seedling from a tray of soil plugs to the ground, wherein the method comprises the steps of:

providing a machine according to the present invention;

loading the soil plugs into the machine;

moving the machine over the ground, so as to plant the seedlings.

In another aspect of the present invention there is provided a method for transplanting soil plugs each containing a seedling from a tray of soil plugs to the ground, wherein the method comprises the steps of:

providing a machine, attached to which is one or more ground preparation and modification devices according to the present invention;

loading the soil plugs into the machine;

moving the machine over the ground, so as to plant the seedlings.

In another aspect of the present invention there is provided a machine adapted to be moved in a direction over the ground for transplanting soil plugs, each plug enclosing and protecting the root system of a seedling, the seedling comprising an above-ground portion extending from the soil plug, the machine comprising:

a machine frame;

one or more conveying means attached to the frame, each conveying means conveying gripping mechanisms around a loop and including a horizontal path portion extending substantially parallel to and adjacent the ground, said horizontal path portion extending parallel to the direction of machine movement for retaining gripping mechanisms on said horizontal path portion in a planting position;

a plurality of gripping mechanisms attached to the conveying means at regular positions, each gripping mechanism comprising a clip defining a pair of jaws for temporarily holding a soil plug, or seedling extending from a soil plug, and transporting the soil plug or seedling into the planting position, the seedling extending from the soil plug in a substantially vertical orientation when in said planting position;

means for driving the conveying means to produce movement along the horizontal path portion at a speed in a range generally corresponding to a ground speed of the machine, such that a gripping mechanism moving along said horizontal path portion in said planting position has a velocity at or near zero, relative to the ground;

means for sequentially presenting said plugs for take up by the gripping mechanisms in synchronization with said conveying means so that succeeding clips on said conveying means confront succeeding plugs;

means for opening each pair of jaws of each gripping means at a position prior to said take-up position;

means for closing each pair of jaws of each gripping means to grip a soil plug at said take up position; and means for opening each pair of jaws of each gripping means to release a soil plug at said planting position;

wherein the machine further comprises:

a ground preparation and preparation and modification device, operable in association with each conveying means and extending in a direction generally parallel to the direction of motion of the machine, each device comprising:

two elongated members joined in a substantially parallel relationship to define therebetween a planting slot having a substantially uniform width, each elongated member configured to contact and exert a pressure upon the ground during forward motion of the machine, the planting slot positioned beneath the horizontal path portion of a corresponding conveyor means to accommodate a soil plug in a planting position; and a ground cutting blade integral with and projecting forward of each device in general alignment with the planting slot, to cut open the ground in front of the device during forward motion of the machine. Preferably, each gripping mechanism is configured to temporarily grip a coniferous seedling comprising an above-ground portion of from 5 to 10 cm in length. More preferably, each jaw of said pair of jaws comprises an elongated body having a first end for attachment to said conveying means, and a second end having a gripping plate in opposition with a gripping plate of an opposing jaw of said pair of jaws for temporarily gripping a soil plug or above ground portion during use, wherein each jaw further comprises an arcuate, curved, or bent seedling retention arm connecting said gripping plate at said second end with said first end, to define an alcove in said clip of sufficient size to receive said above-ground portion of said seedling, thereby to permit retention of said above-ground portion and said soil plug substantially in alignment with a longitudinal axis of said clip.

In another aspect of the present invention there is provided a gripping mechanism for use in connection with the machine of the present invention, the gripping mechanism comprising a clip defining a pair of jaws for gripping a soil plug having an above-ground portion extending therefrom, each jaw of said pair of jaws comprising an elongated body having a first end for attachment to said conveying means, and a second end having a gripping plate in opposition with a gripping plate of an opposing jaw of said pair of jaws for temporarily gripping a soil plug or seedling during use, wherein each jaw further comprises an arcuate, curved, or bent seedling retention arm connecting said gripping plate at said second end with said first end, to define an alcove in said clip of sufficient size to receive an above-ground portion of said seedling, to retain said above-ground portion and said soil plug substantially in alignment with a longitudinal axis of said clip. Preferably, said alcove has a sufficient size to receive an above ground portion of said seedling of 5 to 10 cm in length, and retain said seedling substantially in alignment with a longitudinal access of said clip.

Any mention of the gripping mechanism gripping a soil plug, as described herein, should be taken to mean that the gripping mechanism can grip either the soil plug itself, a seedling extending from the soil plug, or both.

DETAILED DESCRIPTION OF THE INVENTION

The machine of the present invention is particularly adapted for transplanting tree seedlings under a variety of optimum or adverse soil conditions. In particular, the machine, at least in preferred embodiments, can plant seedlings with a high degree of planting depth accuracy.

The machine relies upon the use of specially designed ground preparation and modification devices, which are responsible for ensuring proper seedling plantation and positioning. After significant experimentation, the inventors have discovered that the proper use of the ground preparation and modification devices of the present invention can permit satisfactory transplantation of seedlings even under adverse environmental and soil conditions, including undulating soil, hard-baked or dry soil, or water saturated soil.

The aforementioned ground preparation devices are especially suited for use in connection with a machine of the type generally described in U.S. Pat. Nos. 4,355,588, and 4,443,151, and this aspect relates to a particularly preferred embodiment of the invention. Specifically, the ground preparation devices are intended to replace the 'bed shapers', and the furrow opening and closing means described in this patent. However, the invention is not limited in this regard, and the ground preparation and modification device(s) may be fitted to any suitable machine that is configured to move over the ground in a generally horizontal direction for the transplantation of seedlings.

It should also be noted that the invention provides other improvements over the machine of U.S. Pat. No. 4,355,588, and U.S. Pat. No. 4,443,151, which further improve the operational efficiency of the machine for the transplantation of tree seedlings. Whilst the invention is described for particular use in connection with tree seedlings, the invention is not limited in this regard. Any other seedlings, particularly those that are fragile or prone to entanglement, may be used in accordance with the teachings disclosed herein.

The ground preparation and modification device of the present invention, and a corresponding machine which utilizes the ground preparation and modification device, will now be described with reference to the drawings.

It should be noted that the device is illustrated as having a generally 'ski-like' or 'ski-shaped' profile. While not essential, this configuration pertains to a particularly preferred embodiment of the invention, since the ski-shaped configuration assists smooth travel of the device over the surface of the ground or through surface layers of the ground. Therefore, in preferred embodiments, the term 'device' can also be taken to mean 'ski-shaped device' as required.

Figure 1A:
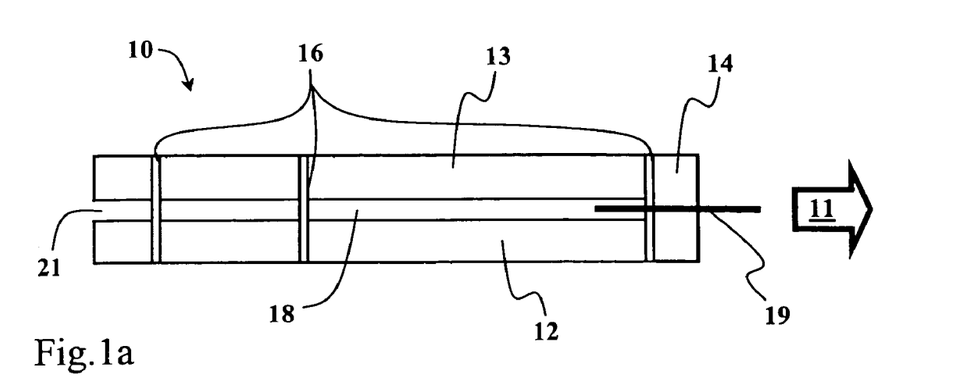
FIG. 1a provides a top plan view of a preferred embodiment of the ground preparation and modification device of the present invention.
Figure 1B:
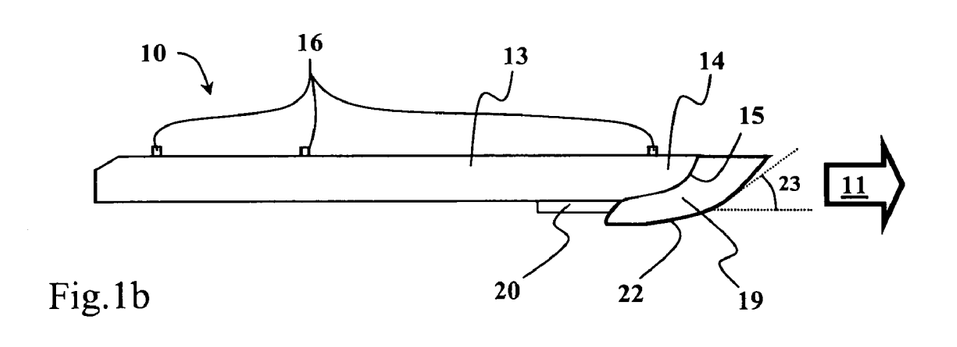
FIG. 1b provides a side elevation view of a preferred embodiment of the ground preparation and modification device of the present invention.
Figure 1C:
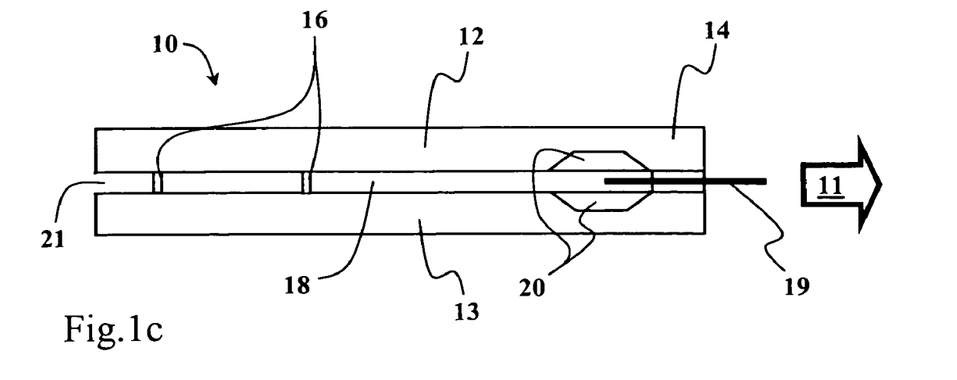
FIG. 1c provides a bottom plan view of a preferred embodiment of the ground preparation and modification device of the present invention.

Turning first to FIG. 1, the ground preparation and modification device is illustrated generally at 10, and the direction of forward motion of the device is illustrated at 11. FIG. 1a provides a top plan view, FIG. 1b provides a side elevational view, and FIG. 1c provides a bottom plan view of a preferred ground preparation and modification device of the present invention. The device comprises two elongated members that are joined at a forward end of the device by a cross-member 14, which may be integral with the elongated members 12 and 13, or alternatively may comprise a separate element suitably fixed to the elongated members. In any event, the device preferably comprises a tapered front end portion 15, shaped to facilitate the pushing of the device across the surface of the ground or through surface layers of the ground. The cross members of the device may be braced by braces generally shown at 16.

The two elongated members are arranged substantially parallel to one another to define therebetween a planting slot 18. Most preferably the planting slot has a generally uniform width along the length of the device. Alternatively, the slot may be tapered such that the widest end of the slot is at the rearmost portion of the device. The inventors have found that a tapered slot with a narrow end at the rearmost portion of the device can result in excessive build-up of soil material within the planting slot, which is not conducive to proper planting of the seedlings.

A ground cutting blade 19 extends to project forward of the device in general alignment with the planting slot. FIG. 1 illustrates the blade being fixed to the cross member 14. In alternative embodiments, the blade may be sandwiched between the elongated members 12, 13, in which case the cross member 14 may be absent. The blade extends in front of the device to cut the ground and assist break up of the ground, thereby contributing to the capacity of the device to be used in adverse soil conditions. As shown in FIG. 1b, the blade may also extend lower in the ground that the elongated portions 12, 13 of the device, and may also extend backwards into the foremost portion of the planting slot 18. Without wishing to be bound by theory, these extensions of the blade are believed to enhance the performance of the device, and help prevent soil build-up within the planting slot 18 between the elongated members 12, 13.

The thickness of the blade 19 is shown as being substantially uniform in FIG. 1. However, the invention is not limited in this regard, and encompasses blades that do not have a uniform thickness, including for example wedge-shaped or tapered blades. Such alternative blade types may generate desirable furrow formation under specific soil or environmental conditions. In addition, the cutting edge 22 of the blade 19 is shown in FIG. 1b to have a configuration such that it cuts the ground at an acute angle 23° relative to horizontal. The inventors have discovered that the preferred angle of ground intersection is from 15° to 45° from horizontal, most preferably about 22° from horizontal.

The informed reader will note that this device configuration, and its use for automated transplanting systems, is completely different from the traditional bed shapers and furrow formers that are known in the art. In fact, the device illustrated in FIG. 1 does not include any form of traditional furrow opening or furrow closing means. Instead, the device relies upon the forward projecting blade to begin break-up of the ground. Subsequently, the ground is further dislodged and modified by the pushing action of the initial portions of the device moving over the ground, including the tapered portion 15. Subsequently, the flat underneath surfaces of the device further grade the ground during forward motion, to define desirable planting conditions for the insertion of soil plugs. The device may include further means 20 to improve the soil conditions and depth of soil within the planting slot, by preventing premature refilling of the cut in the ground at the planting position prior to seedling planting. For example, the means 20 may include a pair of bifurcating ribs extending behind the ground cutting blade to temporarily retain the dislodged soil away from the planting slot at the planting position.

The inventors have discovered that a device configuration in accordance with that of the invention provides a highly suitable soil plug planting zone in the region of ground exposed between the elongated members, and within the planting slot. The nature of the devices ensures accurate planting depth and improved uniformity of soil conditions for planting. The motion of the device over the ground helps to generate conditions that are particularly suited for tree seedlings.

Unexpectedly, the nature of the elongated slot, and the movement of soil within the slot achieves additional advantageous results. Following the planting of a seedling and soil plug into the ground within the planting slot, the device continues its forward motion over the ground, and eventually the planted seedling effectively exits the slot 18 at position 21. The inventors have discovered that the effect of the passage of the planted seedling through the elongated planting slot provides particularly advantageous results with regard to seedling planting. Without wishing to be bound by theory, it is likely that the elongated members of the device induce soil motion around the planted seedlings in such a manner that the seedling becomes at least partially embedded in the ground. The device generates a desirable seedling planting environment, without the need for more complex furrow closing systems, which can damage the fragile seedlings.

Preferred materials for the ground preparation and modification device include stainless steel. Moreover, polished stainless steel is particularly preferred at least for the ground engaging portions of the underside of the device, by virtue of its hard wearing, low drag, and rust-resistant properties. Although less preferred, the ground preparation and modification device may further include packing wheels (not shown) mounted to a rearward portion of the device (behind the planting position) to assist in the packing down of the soil around each planted soil plug/seedling.

The ground preparation and modification device of the present invention may be affixed to a transplanting machine by any suitable means. In particularly preferred embodiments, the device is mounted by means that permit adjustment of the vertical position of the device relative to the machine. For example, the use of hydraulic struts may permit each device to be moved up and down relative to the frame of the machine, either to adjust the pressure of the device on the ground (and the planting depth), or to lift the devices off the ground as required. In addition, the devices may be mounted to the frame of the machine (or to hydraulic struts) via a biasing system, for example comprising springs. In this way, the springs can bias the devices to exert pressure upon the ground, and yet permit a degree of controlled vertical (up-and-down) movement of the devices during operation. In effect, this confers a degree of 'suspension' to each device as it moves through the ground, enabling the devices to self adjust and 'float' through the surface layers of soil. This particular feature has been found to provide significant improvements in planting accuracy and reliability.

In preferred embodiments, the pitch of each ground preparation and modification device relative to the frame of the machine, or relative to the ground, can be altered. For example each device may be attached to a transplanting machine at least at a front end thereof by way of adjustable cam wheels that allow the device to pitch upwards upon encountering the beginning of a hill, or a change in incline or decline. The proximity of the device adjacent the ground can lead to problems when the transplanting machine travels over ground undulations. Upon encountering a hill climb, the pitch of the entire transplanting machine may have changed before the pitch of the device has time to "catch up". In these circumstances, there is a risk of damage to the device (or the linkage of the device to the machine) if undue pressures are exerted by the front end of the device upon the ground. The opposite can occur when the transplanting machine encounter a decline, such that undue pressure may be exerted on rear portions of the device. By allowing for adjustments in the pitch of the device relative to the planting machine, or relative to the ground, such risks can be minimized. Pitch adjustment may be actively controlled by the used of the transplanting machine (e.g. via hydraulic means) or alternatively the pitch adjustment may be more passive, comprising for example a series of sprung cam wheels.

Each device may also be mounted so that the device can undergo a limited degree of lateral motion (perpendicular to a general direction of the machine). In this way, each device can self-adjust its motion laterally, and optimize its position for smooth forward motion.

As previously mentioned, the ground preparation and modification device of the present invention may be used in connection with any suitable transplanting machine, and the present invention pertains both to the device, and also to transplantation machines that incorporate one or more of the devices, as appropriate. In a particularly preferred embodiment of the present invention, the device is used in connection with a transplantation machine disclosed in U.S. Pat. No. 4,355,588, and U.S. Pat. No. 4,443,151, which are incorporated by reference. These patents disclose machines for transplanting seedlings, which comprise a conveyor having a plurality of gripping mechanisms mounted thereto. Typically, the conveyor comprises a chain loop of gripping mechanisms, each gripping mechanism comprising a clip defining a pair of jaws for gripping a soil plug and seedling.

The present invention therefore encompasses a machine such as that described in U.S. Pat. No. 4,355,588, in which the bed shaper, and furrow opening and closing means, are replaced with the ground preparation and modification device disclosed herein. It should be noted that the gripping mechanisms may grip either the soil plug or the seedling extending from a soil plug. Any mention of the gripping mechanism gripping a soil plug, as described herein, should be taken to mean that the gripping mechanism grips either the soil plug itself, a seedling extending from the soil plug, or both. Moreover, any gripping mechanism configuration is within the scope of the present invention. In fact, in particularly preferred embodiments the inventors have found that longer gripping mechanisms or clips (comprising longer gripping fingers) are preferred for delicate handling of coniferous seedlings, when compared to the gripping mechanisms illustrated in U.S. Pat. No. 4,355,588, and U.S. Pat. No. 4,443,151.

Figure 2:
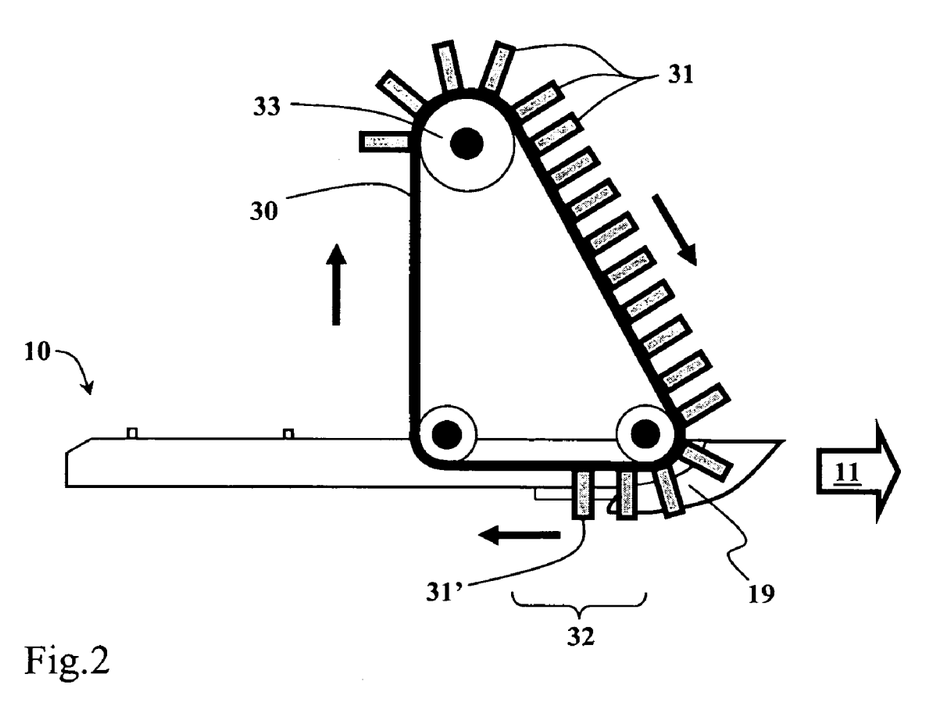
FIG. 2 illustrates a preferred embodiment of the machine of the present invention, in which the orientation of the conveying means and gripping mechanisms is shown relative to the ground preparation and modification device in side elevation.

A typical configuration of this embodiment is illustrated in FIG. 2. In this drawing, the device 10 is shown in side elevation view in accordance with FIG. 1*b*. However, the elongated member 13 has been removed, so that the planting slot 18 is exposed from the side. This is simply to aid illustration of this embodiment of the invention, by permitting consideration of the planting activity within the planting slot 18. The planting machine includes conveyor means 30, which typically comprises a chain conveyor, onto which are attached a plurality of regularly spaced gripping mechanisms(not shown) carrying a soil plug and embedded seedling 31. The conveyor means may be driven, for example by drive wheel 33 to effect continuous motion of the gripping mechanisms on the conveyor. The rest of the machine is not shown, for the sake of simplicity. Means for loading the gripping mechanisms with soil plugs and embedded seedlings is also not shown.

Importantly, the conveyor includes a horizontal path portion 32 in the proximity of the planting slot 18 of the device. The direction of drive of the conveyor is shown (small arrows) such that the gripping mechanisms moving along the conveyor in the vicinity of the horizontal path portion move in a direction that is parallel with but opposite the direction of forward motion of the device over the ground. In this way, a gripping mechanism in a planting position 31' may achieve near zero ground speed, such that a soil plug released by the gripper mechanism 31' is not displaced by any horizontal movement of the soil plug relative to the ground.

In accordance with the embodiment of the invention shown in FIG. 2, the gripping mechanisms must be opened and closed at different positions in the cycle of the conveyor loop. Preferably, the jaws of each gripping mechanism are sprung shut, and must be forced open against the influence of a bias. Preferably, the jaws are forced open at specific positions in the conveyor loop by Teflon™ bars running substantially parallel with a direction of travel of the conveyor loop. The jaws may travel around the Teflon bars such that the jaws are forced open by the presence of the bar between the jaw members. In this way, the Teflon bar may be tapered at appropriate positions to effect the opening and closing of the gripper mechanism jaws, and may be strengthened at the tapered positions by metal bearings.

A preferred feature is illustrated in FIG. 2, wherein the bottom of the gripper mechanism 31' in the planting position is positioned close to the rearmost extension of the cutting blade 19, and is substantially in horizontal alignment with the base of the blade. Without wishing to be bound by theory, this preferred aspect confers further improvements to the accuracy and reliability of seedling plantation.

Figure 3:
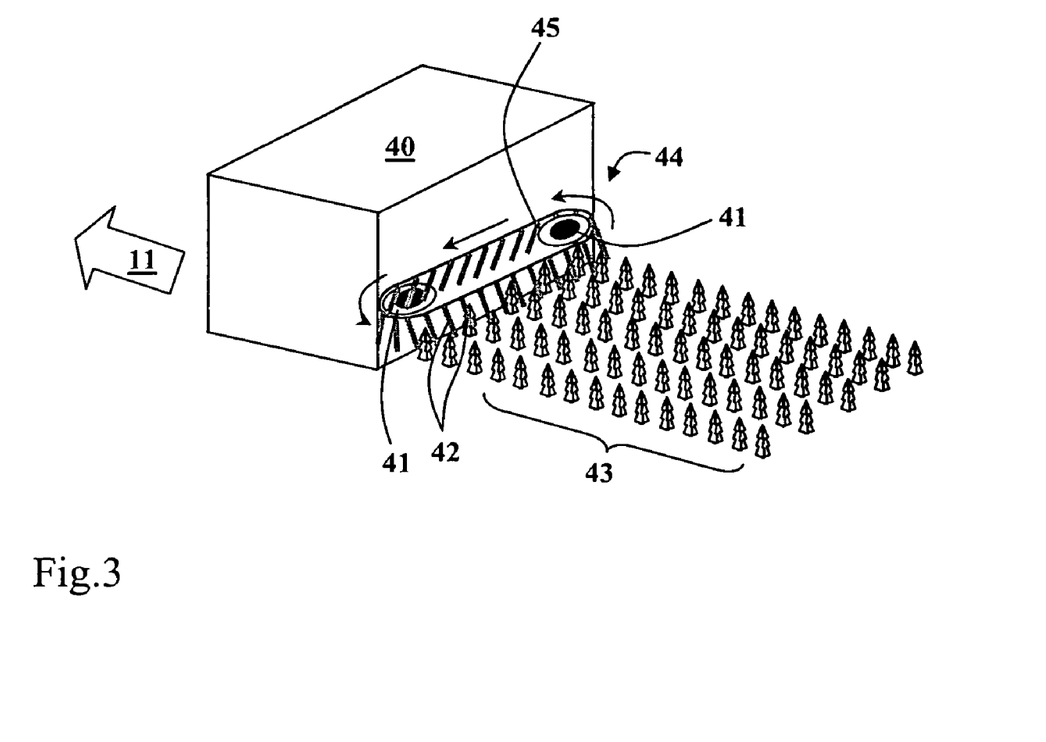
FIG. 3 provides a perspective view of the fluffer for possible use in connection with the machine of the present invention (the machine is illustrated schematically).

Another preferred feature of the machine of the present invention is illustrated in FIG. 3. The machine is shown in perspective view in the form of a block 40 (for simplicity), moving over the ground in a direction 11. Planted rows of seedlings 43 are positioned in the ground behind the machine. The machine includes a fluffer, shown generally as 45. The fluffer includes a continuous belt 45 driven by drive wheels 41, to induce continuous movement of the belt in accordance with the motion illustrated by the small arrows in FIG. 3. A plurality of fluffing elements 42 are attached to the belt, and hang such that one end of each of the fluffer elements brushes across the ground during motion. In this way, the fluffing elements assist in the distribution of soil around planted seedlings behind the machine. The use of a fluffer, whilst not essential to the operation of the machine of the present invention, is especially preferred, and compliments the planting results achieved by the ground preparation and modification devices. Most preferably, the speed of movement, and the height of the fluffer elements relative to the ground can be adjusted according to the ground conditions.

Preferably, the machine of the present invention may further include a speed control system, which maintains the speed of movement of the conveyor means (comprising the gripping mechanisms) substantially similar to the ground speed of the machine. In this way, each gripping mechanism and gripped soil plug may be maintained at near ground speed when traversing the horizontal path portion of the conveyor. Moreover, the speed control system can maintain the seedlings at the planting position at near ground speed, regardless of the velocity of the machine over the ground. In alternative embodiments, the speed control system may be used to maintain the gripping mechanism at the planting position at near, but not exactly ground speed. Under specific circumstances, a small forward or reverse horizontal moment in the seedling at the planting position is known to improve planting reliability, in accordance with the. teachings of U.S. Pat. No. 4,355,588 and U.S. Pat. No. 4,443,151.

Any suitable speed control system may be used for this purpose. For example, a mechanical drive system may be used that provides both power and speed control to drive the planting mechanism via a drive wheel in contact with the ground. In this way, the speed of the drive wheel will directly correlate with the ground speed of the machine. Mechanical linkages to the planting mechanism can be established to ensure that the ground speed of the conveyor means, for example along -a horizontal path portion adjacent the planting slot of the ground preparation and modification device, is near zero. Other systems may also be used to drive and control the speed of the planting mechanism. For example, the planting mechanism may be driven by a hydraulic system that provides a separate power source to that which enables forward motion of the machine. The speed of the hydraulic system may be adjusted and controlled via a ground speed detection device, such as for example a laser or radar-based ground speed detection device. Such ground speed detection devices are known in the art.

In any event, the present invention encompasses transplanting machines that plant seedlings at or near to ground speed. Under specific circumstances (e.g. soil conditions, seedling type etc.), however, it may be desirable to conduct seedling planting at slightly greater or slightly less than ground speed. For this purpose, the speed of the planting mechanism relative to the ground speed of the machine may be adjusted slightly. For example, according to specific soil conditions it may be desirable to conduct planting, wherein the seedlings are placed in the soil with a slight forward momentum. This can be affected by slowing the planting mechanisms slightly relative to the ground speed of the machine. Since the forward motion of the machine will be slightly faster than the rearward motion of the conveyor means adjacent the planting slot, the seedlings will be planted with a slightly positive ground speed.

In accordance with known systems, the soil plugs (comprising the seedlings) may be supplied to the machine in trays of soil plugs, wherein each soil plug is located in a suitable soil plug hole in the tray, and the soil plugs are arranged in ordered rows. The machine of the present invention preferably accommodates one or more of such trays, and includes means to eject an intact soil plug (with seedling) from the tray, and onto a conveyor for conveyance to the planting position. The soil plugs may be pushed out of the tray using a automated system of prongs, which physically contact an underside of each soil plug, and push the soil plug out of frictional engagement with the soil plug hole, and onto an appropriate conveyor. To achieve optimal results, the machine of the present invention utilizes soil plugs comprising a growing medium optionally in admixture with a elastomeric polymer substance, together with an optional slip agent. The slip agent may be any agent appropriate for aiding smooth ejection of soil plugs from corresponding trays. The slip agent may be mixed with the other components of the soil plug, or alternatively may be coated onto a prepared soil plug. In an alternative embodiment, the machine of the present invention may utilize soil plug trays that are pre-coated, at least on the surfaces of the soil plug holes, with a slip agent.

In further embodiments, the present invention provides a method for transplanting soil plugs each containing a seedlings from a tray of soil plugs to the ground, comprising the steps of:

providing a machine in accordance with the teachings of the present application;

loading the soil plugs into the machine;

moving the machine over the ground, so as to plant the seedlings.

In yet another embodiment, the present invention provides a method for transplanting soil plugs containing a seedling from a tray of soil plugs to the ground, comprising the steps of:

providing a machine, attached to which are one or more ground preparation and modification devices in accordance with the teachings of the present application;

loading the soil plugs into the machine;

moving the machine over the ground, so as to plant the seedlings.

In other embodiments, the present invention provides improvements to the gripping mechanisms or clips that are described in U.S. Pat. Nos. 4,355,588 and 4,443,151, to allow the clips to retain coniferous seedlings and other types of seedlings, wherein the above-ground portion of the seedlings is preferably 5 to 10 cm or more in length. In this regard, the inventors have discovered that by altering the configuration for the pair of jaws that define each gripping mechanism, larger seedlings can be accommodated. This can be achieved by providing a gripping mechanism for use in connection with the machine of the present invention, comprising a clip defining a pair of jaws for gripping a soil plug having an above-ground portion extending therefrom, each jaw of said pair of jaws comprising an elongated body having a first end for attachment to said conveying means, and a second end having a gripping plate in opposition with a gripping plate of an opposing jaw of said pair of jaws for temporarily gripping a soil plug or seedling during use, wherein each jaw further comprises an arcuate, curved, or bent seedling retention arm connecting said gripping plate at said second end with said first end, to define an alcove in said clip of sufficient size to receive an above-ground portion of said seedling, to retain said above-ground portion and said soil plug substantially in alignment with a longitudinal axis of said clip. In this way, the provision of a seedling retention arm having a curved, arcuate, or bent configuration presents significant advantages by providing an enlarged alcove in the clip of the gripping mechanism, thereby to accommodate a larger above-ground portion of a seedling, For example, the alcove preferably has a sufficient size to receive an above ground portion of said seedling of 5 to 10 cm in length, and retain said seedling substantially in general alignment with a longitudinal access of said clip. In this way, the above-ground portion of the seedling does not interfere with the structure of the clip and each jaw of the pair of jaws, to achieve general alignment of the above-ground portion of the seedling and the soil plug at the point of take-up and subsequent retention by the clip.

Figure 4A:
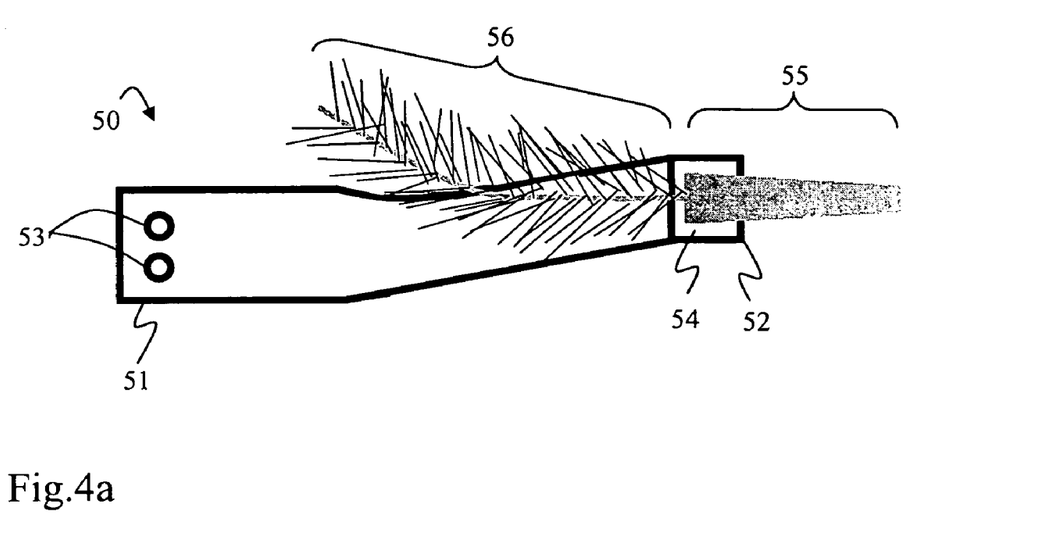
FIG. 4a illustrates a single jaw of a pair of jaws of a seedling or soil plug gripping mechanism of the prior art. A soil plug and above-ground portion of a seedling is also illustrated in a gripped position.
Figure 4B:
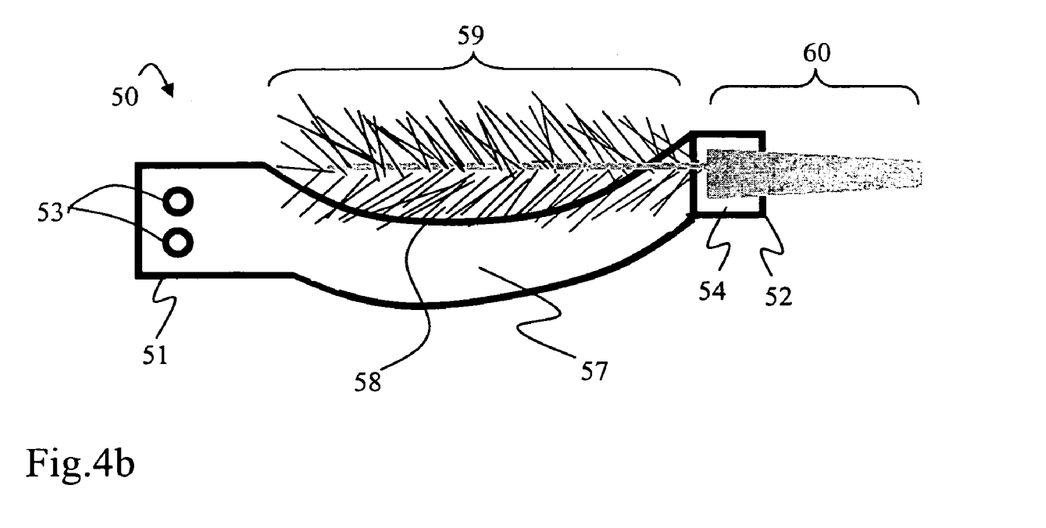
FIG. 4b illustrates a single jaw of a pair of jaws of a seedling or soil plug gripping mechanism of the present invention. A soil plug and above-ground portion of a seedling is also illustrated in a gripped position.

This feature is better illustrated with reference to FIG. 4. FIG. 4a illustrates a single jaw of a pair of jaws derived from a gripping mechanism of the prior art, such as for example a jaw of the gripping mechanisms described in U.S. Pat. No. 4,355,588. The jaw includes an elongated body shown generally as 50, comprising a first end 51 and a second end 52. The first end includes means 53 for attaching the jaw to a conveyor means. The jaw further includes a gripping plate 54 at the second end thereof for gripping a seedling or associated soil plug 55 through cooperation with another gripping plate of an opposing jaw of the pair of jaws (not shown). However, this configuration is known to cause distortion of the above-ground portion (as shown) misalignment of the soil plug with the above-ground portion, and sometimes damage to an above-ground portion 56 of a seedling extending from the soil plug especially if the length of the above ground portion exceeds 5 cm. To address this issue, the inventors have substantially redesigned the configuration of the gripping mechanisms in accordance with the illustration shown in FIG. 4b. Many of the features of the modified jaw of the gripping mechanism overlap with those illustrated in FIG. 4a. However, it will be noted that the jaw (shown generally at 50) includes an curved seedling retention arm 57 to define an alcove 58 for receiving the above-ground portion of the seedling 59 during retention by the clip. This configuration permits the seedling to be retained in general alignment with a longitudinal axis of the jaw member, without any damage or distortion of the above-ground portion of the seeding even if the length of the above ground portion exceeds 5 cm. Furthermore, there is an increased likelihood that the seedling will be planted in a substantially vertical orientation, and will not turn or fall over during the planting operation. Although a generally curved configuration of the seedling retention arm is illustrated in FIG. 4b, other configurations, such as arcuate or bent configurations will also achieve the same or similar results.

While the invention has been described with reference to particular preferred embodiments thereof, it will be apparent to those of knowledge in the art upon reading and understanding of the foregoing that numerous seedling transplantation devices, and machines incorporating them related to the specific embodiments illustrated are attainable, which nonetheless lie within the spirit and scope of the present invention. It is intended to include all such designs, and equivalents thereof within the scope of the appended claims.

The invention claimed is:

1. A ground preparation and modification device for use in connection with a machine adapted to move over the ground for transplanting seedlings, the machine including conveying means for conveying seedlings in soil plugs into a planting position, characterized in that the device extends generally parallel to the direction of motion of the machines and comprises:

two elongated members joined in a substantially parallel relationship to define therebetween a planting slot having a substantially uniform width, each elongated member having a substantially flat underneath surface configured to contact and exert a pressure upon the ground thereby to grade the ground during forward motion of the device to generate desirable planting conditions for the seedlings, the planting slot positioned to accommodate each soil plug in said planting position; and a ground cutting blade integral with and projecting forward of each device in general alignment with the planting slot, to cut open the ground in front of the device during forward motion of the machine.

2. The device according to claim 1, characterized in that said conveying means includes a horizontal path portion for positioning said seedlings adjacent the ground in said planting slot at or near ground speed.

3. The device according to claim 2, characterized in that the speed of movement of the conveying means is substantially equal to the ground speed of the device, thereby to maintain the seedlings at or near zero ground speed for planting when in said horizontal path portion.

4. The device according to claim 1, characterized in that each ground cutting blade also projects backwards into said planting slot to a position adjacent said horizontal path portion of said conveying means.

5. The device according to claim 1, characterized in that each ground cutting blade intersects a surface of the ground at an angle of from 15° to 45° from horizontal.

6. The device according to claim 5, characterized in that each ground cutting blade intersects a surface of the ground at an angle of about 22° from horizontal.

7. The device according to claim 1, characterized in that each ground cutting blade also projects beneath the device to a depth substantially similar or greater than a base of the soil plug in the planting position.

8. The device according to claim 1, characterized in that each elongated member has a ski-shaped elevational profile, thereby to facilitate movement of said ground preparation and modification device across the surface of the ground, or through surface layers of the ground.

9. The device according to claim 1, characterized in that the device further comprises means to prevent excessive soil build-up in said planting slot between said elongated members.

10. The device according to claim 9, characterized in that said means to prevent excessive soil build-up comprises a pair of bifurcating ribs extending behind and beneath the ground cutting blade.

11. The device according to claim 1, characterized in that each device can undergo limited lateral movement in a direction perpendicular to the direction of motion of the machine.

12. The device according to claim 1, characterized in that in use said device can be displaced vertically against the bias of a biasing means, such as a spring or springs thereby causing said elongated members to exert a pressure upon said ground.

13. The device according to claim 1, characterized in that in use the pitch of each device can be inclined or declined relative to a horizontal plane.

14. The device according to claim 1, characterized in that in use the height of the device relative to the ground, or the degree of pressure that the device exerts on the ground, can be adjusted.

15. A method for transplanting soil plugs each containing a seedling from a tray of soil plugs to the ground, characterized in that the method comprises the steps of:

providing a machine, attached to which is one or more ground preparation and modification devices according to claim 1;

loading the soil plugs into the machine;

moving the machine over the ground, so as to plant the seedlings.

* * * * *